United States Patent [19]

Mochizuki et al.

[11] Patent Number: 5,290,617
[45] Date of Patent: Mar. 1, 1994

[54] SLIDING STRUCTURE FOR A HIGH LOAD

[75] Inventors: Zenichi Mochizuki, Fuji; Akihiko Tsuda, Atsugi; Masaki Shimada, Numazu, all of Japan

[73] Assignee: Toshiba Kikai Kabushiki Kaisha, Tokyo, Japan

[21] Appl. No.: 866,366

[22] Filed: Apr. 10, 1992

[30] Foreign Application Priority Data

Apr. 12, 1991 [JP] Japan ................... 3-108825

[51] Int. Cl.⁵ ............................................ F16N 1/00
[52] U.S. Cl. ......................... 428/67; 184/6.18; 184/8; 184/64; 184/98; 184/99; 184/100; 428/131; 428/408; 428/698
[58] Field of Search ............ 428/67, 131, 408, 698; 184/99, 100, 98, 8, 64, 6.18

[56] References Cited

U.S. PATENT DOCUMENTS

| 517,300 | 3/1894 | Ridsdale | 184/99 |
| 3,179,395 | 4/1965 | Esler | 184/99 |
| 3,210,137 | 10/1965 | Williams | 184/100 |
| 3,577,746 | 5/1971 | Dolan | 464/162 |
| 3,718,209 | 2/1973 | Moslo | 184/100 |
| 4,784,499 | 11/1988 | Fukute | 384/295 |
| 5,050,707 | 9/1991 | Wilhelmsen | 184/64 |

FOREIGN PATENT DOCUMENTS 74670 7/1978 Japan ................... 184/98

Primary Examiner—Ellis P. Robinson
Assistant Examiner—Nasser Ahmad
Attorney, Agent, or Firm—Cushman, Darby & Cushman

[57] ABSTRACT

A sliding structure for high load and having high strength as well as sufficient lubricating performance, wherein a solid lubricating material is buried in a sliding surface, an oil reservoir of a predetermined capacity is formed on the reverse of the surface; oil supplying pores extend from the oil reservoir to the sliding surface; and a continuous pore material inserted into the oil supplying pore which provides a limited supply of oil to the sliding surface concerned.

17 Claims, 8 Drawing Sheets

F I G. 3
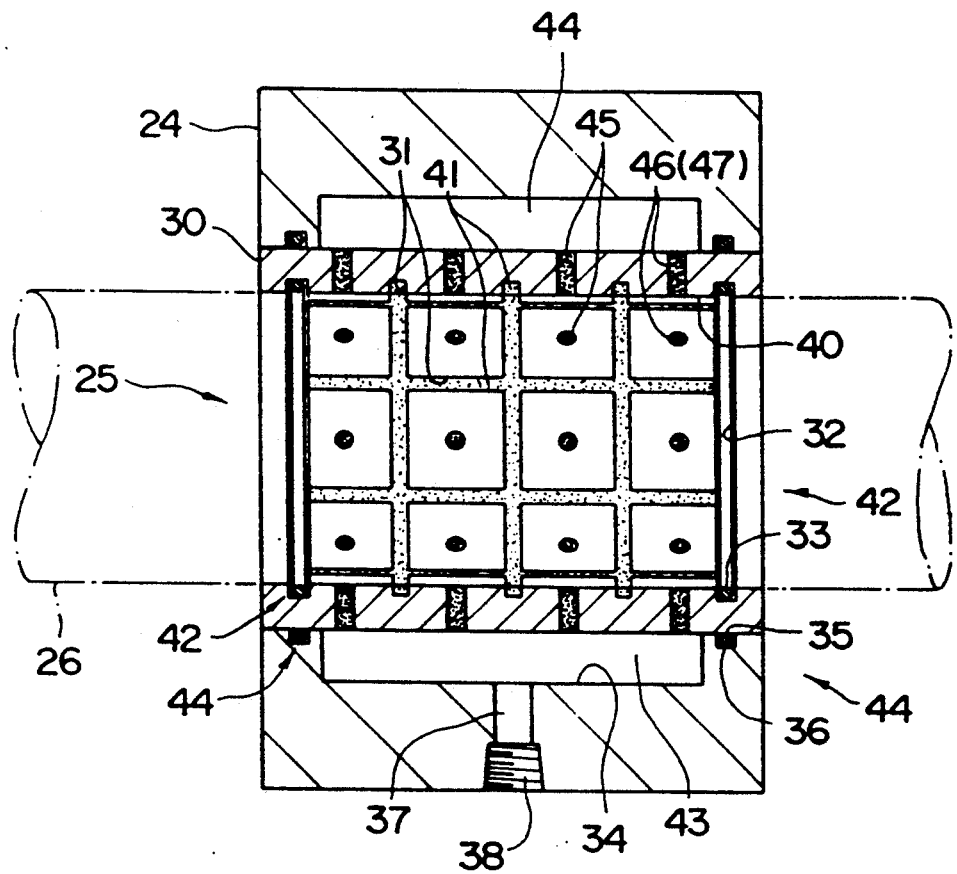

SLIDING STRUCTURE FOR A HIGH LOAD

BACKGROUND OF THE INVENTION

1. FIELD OF THE INVENTION

This invention relates to sliding structures for a high load, and more particularly to sliding parts working under a high load such as a bushing sleeve of a toggle type mold clamping apparatus of an injection molding machine or a die-casting machine.

2. DESCRIPTION OF THE RELATED ART

In a mold clamping apparatus of an injection molding machine or a die-casting machine, a guide mechanism for opening and closing a mold or a toggle mechanism for clamping a closed die with high pressure has previously been used.

In rotative sliding parts of the toggle mechanism or in reciprocating sliding parts of the guide mechanism, steel or cast iron bushing sleeves are used. Steel or cast iron is used to increase the bushing sleeves withstandability to a high load caused by the high pressure clamping of the mold. The above mentioned rotative sliding parts or reciprocating sliding parts are required to have increased lubricativeness to make the mold open/closed smoothly. To this end, not only lubrication by supplying oils and fats but also non-oil supply type lubrication by a solid lubricating material has been practiced in recent years. As with oil-supply lubrication, automatic oiling by the connection of the automatic oiling apparatus is practiced in addition to periodical greasing by hand work.

On the other hand, there are the non-oil supply type lubrication systems. Granulated solid lubricating can be used for non-oil supply type lubrication. For example, graphite, can be embedded in a metal material of the bushing sleeve.

However, the oil supply type lubrication described above has the problem that the lubricating oil leaks out of the sliding parts to stain their surroundings or adheres to the moldings to stain them.

Furthermore, as the troublesomeness of the periodical maintenance is unavoidable in the manual lubrication, there is a danger of shortage of the lubricativeness due to a limited of lubrication supply. Also, in the case of the automatic lubrication, there is a danger of insufficient lubricativeness if the supply of lubricating oil is inadequate due to incorrect adjustment. Such poor lubrication would cause abrasion or malfunction of the sliding surfaces.

In the non-oil supply lubrication described above, there is the problem that the lubrication is limited to the granular parts of the solid lubricating material. The bushing sleeve cannot get enough lubricating performance if the metal material exposed around the granular material is a material of low lubricativeness such as a steel material.

In the case of using a bushing sleeve made of copper or the like which has high lubricativeness, there is the problem that its strength is insufficient and the respective members of the mold clamping device cannot resist a high load up to 1000–1300 kgf/cm$^2$.

It is an object of the present invention to provide a high load sliding structure, which has high strength, ensures sufficient lubrication, and is easy to handle and prevents staining of the surroundings.

SUMMARY OF THE INVENTION

This invention provides a sliding structure for a high load, comprising a solid lubricating material buried in any one of a pair of surfaces sliding on each other under high load; an oil reservoir of a predetermined capacity formed at the reverse surface of any one of the sliding surfaces; means for providing an oil supplying pore which extends from the oil reservoir to the sliding surface concerned; and a continuous pore material having minute continuous pores inserted into the oil supplying pore such that when a lubricating oil is supplied to the oil supplying pore the continuous pore material provides a limited supply of oil to the sliding surface concerned.

For the continuous pore material, any one of the continuous pore material may be used. For attaching the continuous pore material to the oil supplying pore, any solid lubricating material may be used.

The oil supplying pore is preferably a pore of about 1 mm in diameter, or a pore of about 2 mm in diameter and filled up with a solid lubricating material, or a pore of about 5 mm in diameter and filled up with a continuous pore material whereof the ratio of pores (the ratio of the total area of pores to the surface area) is 10–25%.

For the continuous pore material, molded materials of various resins and inorganic materials or the like are applicable. Each has minute continuous pores. Hollow tube fibers having pores are also applicable. Furthermore, materials having self-lubricativeness such as graphite are also applicable.

As the solid lubricating material, a solidified mixture of powdery grains of a material having fixed lubricativeness such as molybdenum disulfide (MoS$_2$) or boron nitride (BN) and an acrylic resin or epoxy resin, or a solid having lubricativeness such as graphite is applicable, and preferably, it includes pores to thereby absorb and hold an oil for lubrication therein.

While as the basic material of the sliding surfaces, an ordinary steel material is applicable, cast iron, a steel nitride or the like having lubricativeness is more preferable.

Preferably, a seal structure for the prevention of leak of an oil is formed by arranging a sealing material such as an O-ring around the oil reservoir or the sliding surfaces.

According to the present invention as described above, basic lubrication is performed by the solid lubricating material. The lubricating oil of the oil reservoir is supplied to the sliding surfaces through the oil supplying pore, so that lubrication to the sliding surface parts is performed. Hence, the basic material of the sliding surfaces is not required to secure high lubricativeness, and the resistance to load is improved by using a material which has high strength such as a steel material.

Besides, the quantity of supplied lubricating oil is decreased because the basic lubrication is performed with the solid lubricating material Therefore, enough lubrication is ensured even if maintenance is not made for a long time, and the stain of the surroundings or the molded products due to the leak of oil is prevented. Thus, the above object is achieved.

BRIEF DESCRIPTION OF THE DRAWINGS

FIG. 3 is a sectional view of the principal part of the embodiment;

DETAILED DESCRIPTION OF THE PREFERRED EMBODIMENT(S)

An embodiment of the present invention will be described hereinafter with reference to the drawings.

Figure 1:
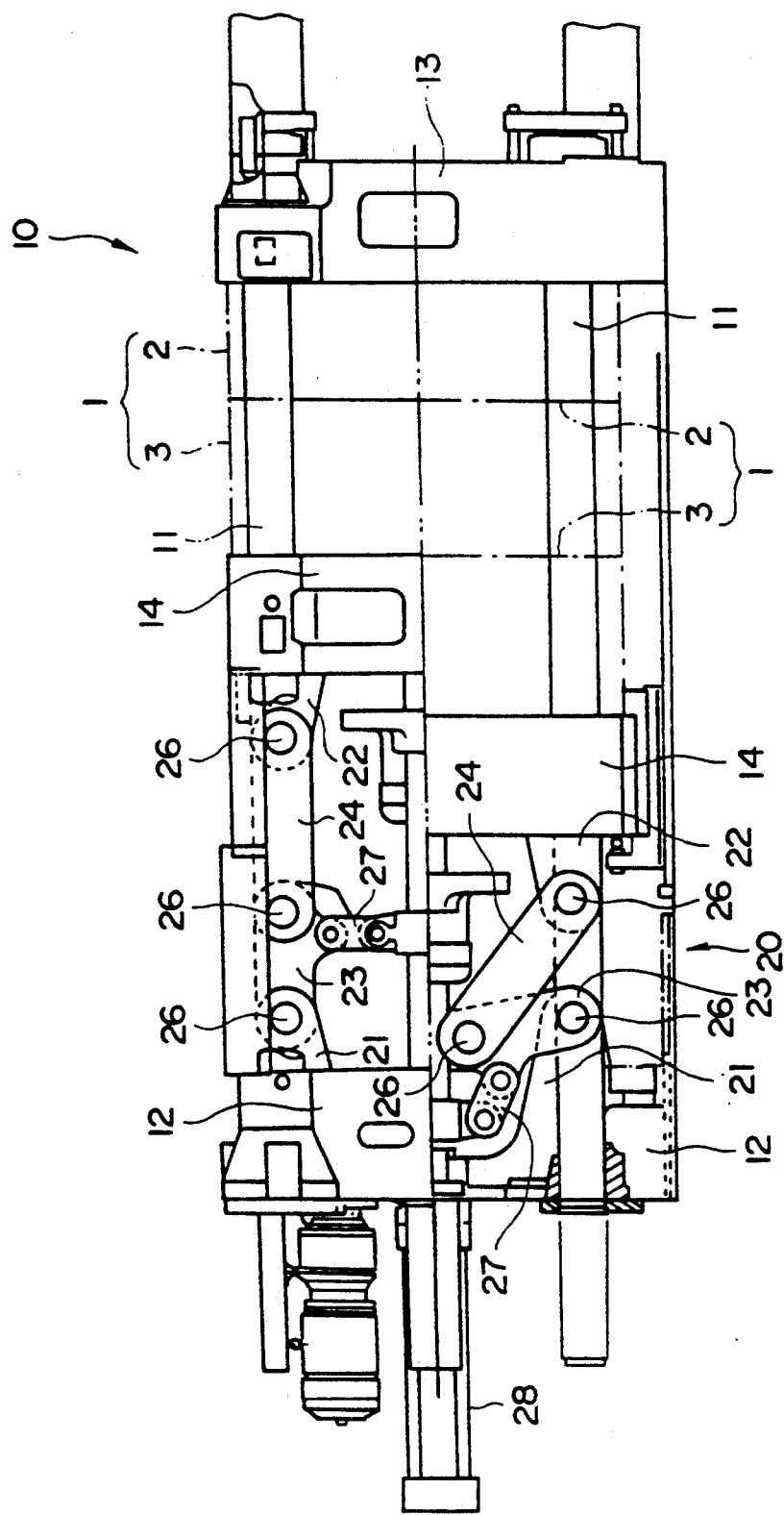
FIG. 1 is a side view of an embodiment of the present invention.

A toggle type mold clamping apparatus 10 which is used in a molding machine is shown in FIG. 1. The clamping apparatus 10 includes parallel tie bars 11, a base 12 and a fixed type attachment 13 secured at both ends of the tie bars, and a moving-type attachment 14 movable along the tie bars 11 between the elements 12 and 13.

A fixed side 2 of a mold 1 is secured to the fixed type attachment 13, and a moving side 3 is secured to the moving type attachment 14. The opening and closing of the mold 1 and the clamping of the mold in the closed condition are performed by making the respective attachments 13, 14 closer to and remoter from each other, to thereby to form a predetermined shaped closed space (molding cavity) in the inside of the mold 1.

The fixed type attachment 13 is fixed at ends of the tie bars 11 while the base 12 and the moving-type attachment 14 are supported movable along the tie bars 11.

The base 12 is fixable at any position on the tie bars 11 by a fixing mechanism (not shown).

The moving-type attachment 14 is driven along the tie bars by a toggle mechanism 20 for opening/closing and clamping the mold provided between the attachment 14 and the base 12.

Figure 2:
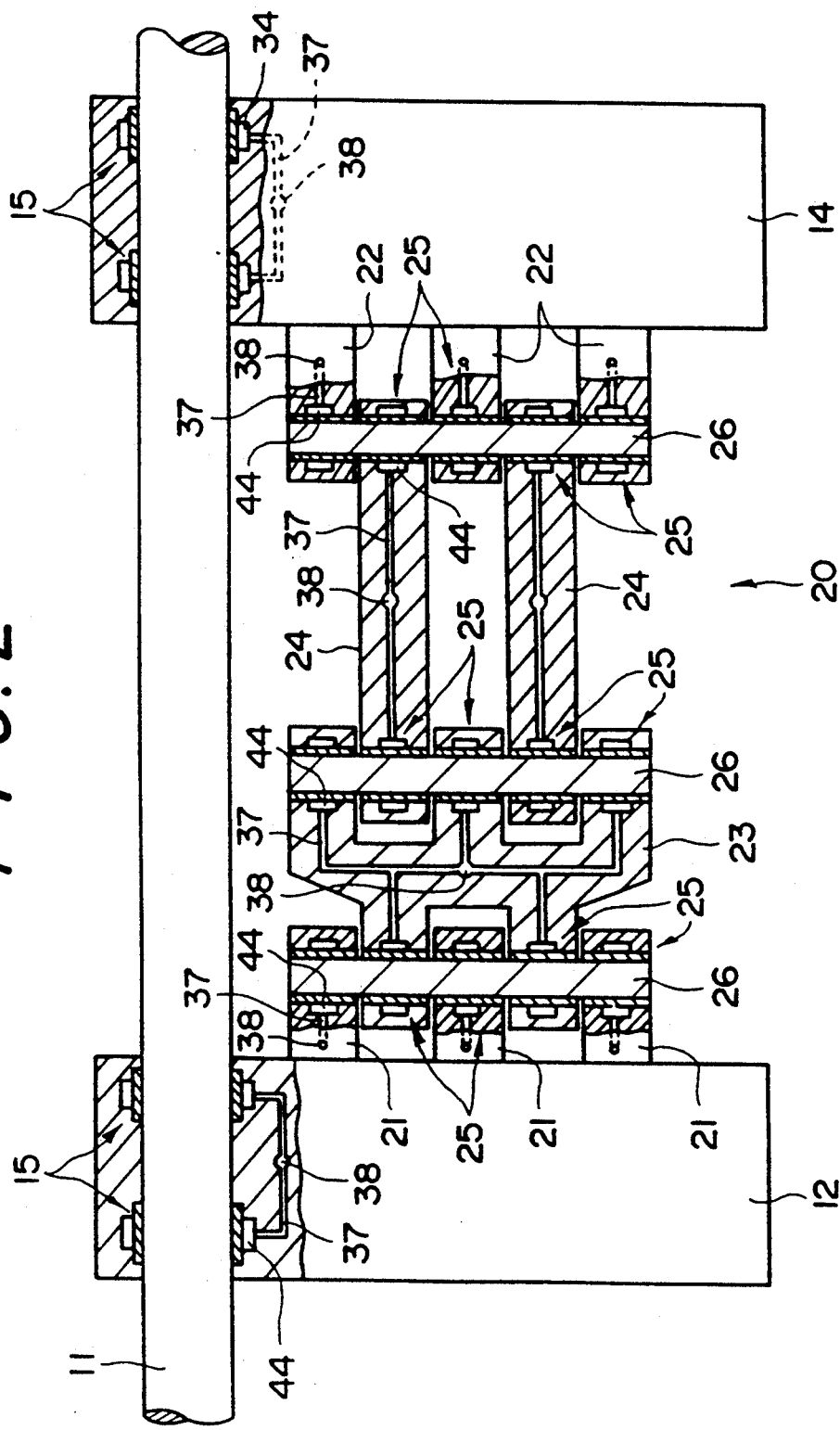
FIG. 2 is a plan view of a part of the embodiment.

As shown in FIG. 2, brackets 21, 22 are formed on the base 12 and the moving-type attachment 14, respectively. First and second links 23, 24 are disposed therebetween, and these elements are connected rotatively by corresponding pins 26 extending through pin bushing sleeve 25 at ends thereof.

The links 23, 24 stretch almost straight when the moving-type attachment 14 close to the fixed type attachment 13 while they bend as the moving type attachment 14 moves away from the fixed type attachment 13.

A sublink 27 is connected rotatively to the first link 23 and it is also connected to a hydraulic driving cylinder 28 provided at the center of the base 12. By the backward and forward movements of the driving cylinder 28, the stretch and bend of the links 23, 24 are performed. Thus, the moving-type attachment 14 is moved close to or away from the fixed-type attachment 13 to thereby open or close the mold 1.

Here, the positional relationship between the base 12 and the fixed type attachment 13 is adjusted according to the thickness of the closed mold 1 so that the links 23, 24 have not stretched completely when the mold 1 is closed. Thus, by the subsequent driving of the driving cylinder 28, the links 23, 24 are pushed outward to open and clamped by the toggle movement.

Thus, the toggle mechanism 20 is thereby composed, and the opening and closing of the mold 1 as well as the powerful clamping when it is closed are made collectively only by the operation of the driving cylinder 28.

The sliding structure for a high load on the basis of the present invention is applied to the rotatable connecting parts of the brackets 21, 22, the pin bushing sleeves 25 formed at the links 23, 24 or the sublink 27 of the toggle mechanism 20.

Besides, slide bushing sleeves 15 are provided to sliding parts between each of the base 12 and the moving-type attachment 14 and the tie bars 11. The sliding structure for high load based on the present invention is applied also to the slide bushing sleeves 15.

Figure 4:
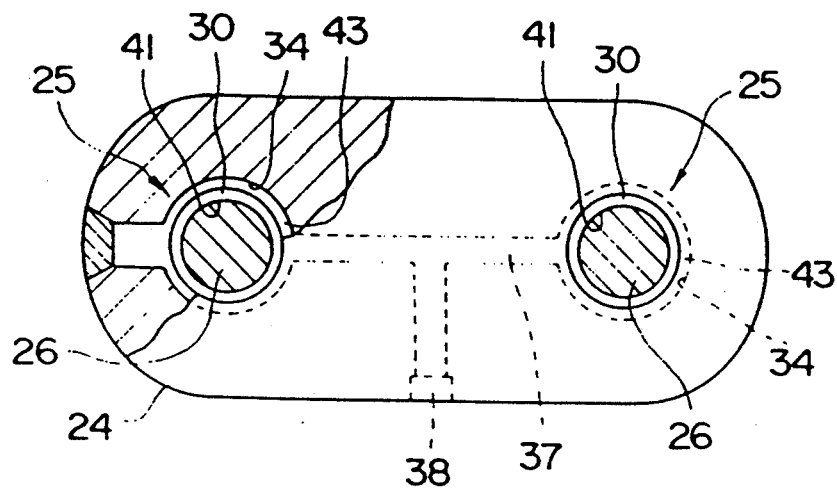
FIG. 4 is a cutaway side view of the principle part of the embodiment.

The pin bushing sleeve 25 is shown in FIG. 3, and the second link 24 having pin bushing sleeves 25 at each of its ends is shown in FIG. 4.

A steel tubular bushing sleeve body 30 as the pin bushing sleeve 25 to which the pin 26 is inserted is cold fitted to the link 24. The internal circumferential surface of the bushing sleeve body 30 is a sliding surface 40 on which the pin 26 slides.

The pin 26 is made of a quenched steel such as quenched SKD61 and plating or coating by spraying is made on the surface of the pin 26 for rust prevention.

A solid lubricating material 41 is embedded in the overall internal circumferential surface of the bushing sleeve 30.

The solid lubricating material 41 is a mixture of molybdenum disulfide grains and an epoxy resin filled up into and solidified in grooves 31 whereof the width is about 2 mm and the depth is about 1 mm formed in the internal circumferential surface of the bushing sleeve body 30.

A circumferential groove 32 is formed along each of both open ends of the bushing sleeve body 30, and an O-ring seal 33 closely contacting the whole circumference of the pin 26 is fitted into each groove to thereby constitute a seal structure 42 for prevention of the leakage of a lubricating oil so as to surround a sliding surface 40.

A concavity 34 is formed in substantially the whole internal circumference of the bore in the link 24 to which the bushing sleeve body 30 is fitted to thereby form an oil reservoir 43 reserving about 50cc of the lubricating oil in cooperation with the outer surface of the fitted bushing sleeve body 30.

A groove 35 is formed in the internal circumference of the link 24 in the vicinity of each of both outer ends of the concavity 34, an O-ring seal 36 closely contacting the whole circumference of the bushing sleeve body 30 is fitted into the corresponding groove 35 to thereby form a seal structure 44 for the prevention of the leakage of oil so as to surround the oil reservoir 43.

An oil supply passage 37 communicating with the oil reservoir 43 of each pin bushing sleeve 25 is formed in the link 24 so as to open to the surface of the link 24, and is usually closed by a screwing plug 38. The oil reservoir 43 by is filled with lubricating oil injecting the lubricating oil into the passage 37 after the plug 38 is taken off.

Formed in the bushing sleeve 30 are oil supply pores 45 each diameter of which is about 1-5 mm. Each pore in the bushing sleeve extends from the internal circumferential surface of the bushing sleeve which communicates with the pores of the cells in the lattice to the other circumferential surface of the bushing sleeve which faces the oil reservoir 43. The oil supply pores can be filled with a continuous pore material 46. Alternatively, the oil supply pores can be filled with a solid lubricating material 47 if no oil is supplied to the oil supply pores. If no oil is supplied and no solid lubricant is available, then the oil supply would be empty.

The continuous pore material 46 includes a graphite rod whereof the ratio of pores is about 10-25% with an epoxy resin adhesive applied therearound, and inserted and fixed in a corresponding oil supplying pore 45. The lubricating oil is supplied from the oil reservoir 43 for lubrication little by little to the sliding surface 40 through the minute continuous pores formed in the graphite material.

The bushing sleeve body 30 is finished by drying at about 200° C. for one hour. Then the internal circumference after the solid lubricating material 41 is filled up and solidified in the grooves as well as after the continuous pore material 46 or the solid lubricating material 47 is inserted into and adhered to the oil supplying pore 45.

While the sliding structure for high load according to the present invention has been described with respect to the pin bushing sleeve 25 of the second link 24, a similar pin bushing sleeve structure can be used also in the other links 23 or the brackets 21, 22.

However, in the other link 23 or the brackets 21, 22, the shape of the oil supplying passage 37 varies depending on the layout of the pin bushing sleeve 25.

In FIG. 2, the brackets 21, 22 each have one pin bushing sleeve 25. The oil supplying passage 37 and the plug 38 corresponding to the oil reservoir 43 of the pin bushing sleeve 25 are formed in each of the brackets 21, 22.

The first link 23 is of a united type having many pin bushing sleeves 25, and has a multi-divergent oil supplying passage 37 communicating with the respective pin bushing sleeves 25, and supplies an lubricating oil at a time from one plug 38 to the respective oil reservoirs 43 of the pin bushing sleeves 25.

Furthermore, the slide bushing sleeves 15 of the base 12 and the moving-type attachment 14 have similar structure to that of the pin bushing sleeve 25 and its further description will be omitted.

In the clamping apparatus 10 of the present embodiment thus composed, the respective plugs 38 are taken off and the lubricating oil is filled up into the oil reservoirs 43 for the pin bushing sleeves 25 as well as the slide bushing sleeves 15 from the oil supplying passages 37 before the operation.

When the operation starts, the lubrication for the respective rotative sliding parts of the link mechanism 20 connected rotatively by the pins 26 is performed by the corresponding pin bushing sleeves 25, and the lubrication for the respective reciprocative sliding parts of the base 12 and the moving type attachment 14 supported slidably by the tie bar 11 is performed by the respective slide bushing sleeves 15.

In the pin bushing sleeves 25, basic lubrication between the pin 26 and the pin bushing sleeves 25 is performed by the solid lubricating material 41. The lubricating oil of the oil reservoir 43 is supplied to the sliding surface 40 through the oil supplying pores 45, between cells of the lattice of the solid lubricating material 41 on the surface of sliding surface 40, and lubricates the surfaces of the pin 26 and of the bushing sleeve sliding on the pin 26.

Also, in the slide bushing sleeve 15, basic lubrication between the tie bar 11 and the slide bushing sleeves is performed by the solid lubricating material 41. Lubrication for the sliding surfaces 40 sliding on the tie bars 11 is also performed by the lubricating oil from the oil supplying pore 45.

According to the present embodiment, since the lubricating action by the lubricating oil from the oil supplying pores 45 is obtained in addition to the basic lubrication by the solid lubricating material 41, sufficient lubrication is ensured between the pin bushing sleeve 25 and the pin 26 as well as between the slide bushing sleeves 15 and the tie bars 11.

Besides, in the sliding surface 40, sufficient lubrication is obtained by the lubricating oil from the oil supplying pores 45 irrespective of the material of the bushing sleeve body 30. The withstandability of the pin bushing sleeves 25 and the slide bushing sleeves 15 to high load is increased by using a high strength steel material as the bushing sleeve body 30.

Therefore, even the rotative sliding parts of the toggle mechanism 20 of the clamping apparatus 10 which is exposed to a high load when the mold is clamped or the reciprocative sliding parts of the moving type attachment 14 and the base 12 obtains sufficient lubrication to thereby perform mold clamping, etc., smoothly.

Consumption of the lubricating oil from the oil reservoir 43 is decreased by supplying only the quantity of a lubricating oil which is just enough for positive lubrication to the sliding surface 40. Thereby, the cycle of maintenance work such as the replenishment of an lubricating oil is extended.

Especially, in the present embodiment, by using the oil supplying pores 45 having a diameter of about 5 mm into which the continuous pore material 46 of graphite having 10-25% of a ratio of pores is filled up, the oil supplying pores 45 into which the solid lubricating material 41 having a diameter of about 2 mm and having pores similar pores is filled up, or the oil supplying pores 45 having a diameter of about 1 mm into which nothing is filled up, a proper quantity of lubricating oil can be supplied to the sliding surface 40, or the buried solid lubricating material 41. The sliding surfaces continue to have high strength. Additionally, sufficient lubrication is maintained positively for a long time.

As an experimental example, the clamping apparatus 10 of the present embodiment was attached to a 150-ton die casting machine and one-million successive tests equivalent to a year operation were made. None of the pins 26 sliding on the respective pin bushing sleeves 25 were worn away and only one of the sliding surfaces 40 of the respective pin bushing sleeves 25 was worn by 0.08 mm, but all others were worn by, 0.03 mm or less. Thus, sufficient lubrication was obtained over many cycles.

Because the consumption of lubricating oil was about 30 cc and the capacity of the oil reservoir is 50 cc, it will be understood that no oil will need to be added for five years.

Furthermore, by changing the ratio of pores of graphite used as the continuous pore material, 46, the quantity of the lubricating oil supplied to the oil supplying pores 45 can be set. Adjustment by maintenance can be performed easily.

In the present embodiment, since the lubricating oil supplied to the sliding surface 40 is made small and sealed by the seal structure 42 surrounding the sliding surface 40, the leak of the lubricating oil supplied to the sliding surface 40 is prevented.

Since the seal structure 44 surrounding the oil reservoir 43 is set up outside the bushing sleeve body 30, the leak of the lubricating oil reserved in the oil reservoir 43 is also prevented.

Therefore, in the pin bushing sleeve 25 and the slide bushing sleeve 15 of the present embodiment, leak of the oil is prevented as in the non-oil supply system. Equipment or a floor around the clamping apparatus 10 is not stained because leaks are prevented. Further, the moldings manufactured by the mold 1 are also prevented from staining.

The present invention is not limited to the above embodiment and the following variations are contemplated as included in the present invention.

For example, while in the above embodiment, graphite of a ratio of pores of 10-25% was filled up into the oil supplying pore 45 as the continuous pore material 46, the diameter and profile of the oil supplying pores 45, the size and ratio of pores of graphite material used, etc., may be selected suitably on practicing.

A Table 1 shows for each rate of pores of graphite the time required for the lubricating oil to penetrate into and to get saturated in each pore, the quantity of consumption of the lubricating oil required for the actual operation of the above embodiment for 100 hours, and the mechanical compression strength.

TABLE 1

| Ratio of pores of graphite (%) | Lubrication oil saturation time (hr) | Lubrication oil consumption (cc) | Compression strength (g/cm$^2$) |
| --- | --- | --- | --- |
| 5 | 20 | 0.01 | 1000 |
| 10 | 5 | 0.05 | 900 |
| 15 | 3 | 0.10 | 700 |
| 20 | 1 | 0.50 | 500 |
| 25 | 0.5 | 1 | 300 |
| 30 | 0.1 | 1 | 280 |
| 40 | 0.05 | 2 | 100 |

As shown in Table 1, when the ratio of pores exceeds 25%, graphite becomes fragile and lowers in strength, and may be broken due to sliding on the sliding surface 40.

When the ratio of pores is less than 10%, the time required for the lubricating oil to penetrate increases and the supply of the lubricating oil to the sliding surface 40 gets insufficient, and as a result lubrication failure may happen.

Therefore, the graphite or the like which is used for the continuous pore material 46 is preferably set so as to have a ratio of pores of 10-25%.

If a solid lubricating material 47 except graphite is inserted into the oil supplying pores 45, it is preferable that the diameter of the oil supplying pores 45 is set to about 2 mm to prevent the breaking of the material 47 since the ratio of pores of the solid lubricating material 47 is generally high; 25-35%.

When nothing is filled into the oil supplying pores 45, it is preferable to set the diameter of the oil supplying pores 45 to about 1 mm to prevent rapid supply of oil.

Furthermore, the continuous pore material 46 is not limited to graphite, and may be made of one of various kinds of molded resins or inorganic materials and the like having minute continuous pores, or hollow tube fibers provided so as to form pores.

Also, in these cases, it is also preferable that the ratio of pores and the sectional area of the pores are adjusted appropriately by considering the passibility of the lubricating oil as well as the strength of the pore material 46.

While in the embodiment the mixture of molybdenum disulfide powder and an epoxy resin and filled and solidified in the groove 31 is used as the solid lubricating material 41, the powder of a material having fixed lubricativeness such as boron nitride (BN) may be used instead of molybdenum disulfide. An acrylic resin or the like may be used instead of an epoxy resin.

In addition to fixing by resin molding, a solid material having lubricativeness such as graphite may be fixed with an epoxy resin adhesive in the groove 31.

Besides, pores may be formed in the material of the solid lubricating material 41, so that lubricativeness is increased by absorbing and maintaining the lubrication oil supplied to the sliding surface 40.

The shapes, sizes, set intervals, and numbers of the grooves 31 in the sliding surface 40, the solid lubricating material 41 filled into the grooves 31, the oil supplying pores 45 extending through the bushing sleeve body 30, the continuous pore material 46 and the solid lubricating material 47 filled into the pores 45 are not limited to those in the embodiment, and they may be selected as desired in practice.

Figure 5:
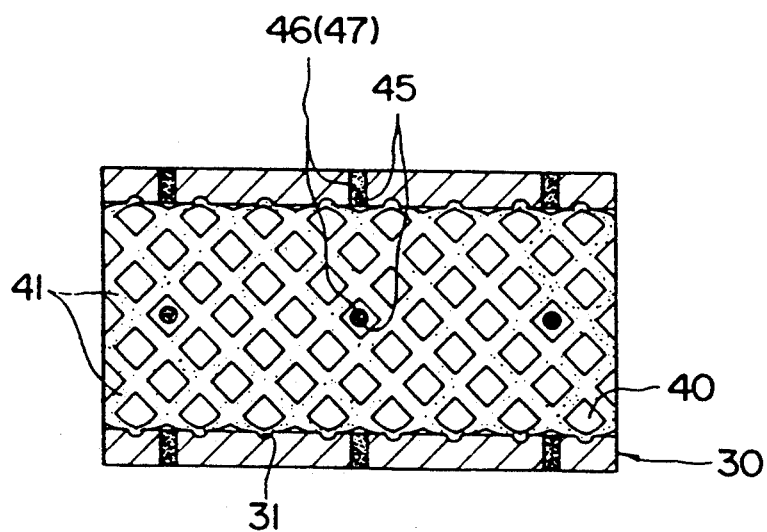
FIG. 5 is a sectional view of a modification of the present invention.

For example, as shown in FIG. 5, the solid lubricating material 41 may take the form of a tilted lattice, as shown in FIG. 5. While in the embodiment the groove 31 into which the solid lubricating material 41 is filled is shown as taking the form of a rectangle in section, it may take the form of a semicircle.

Figure 6:
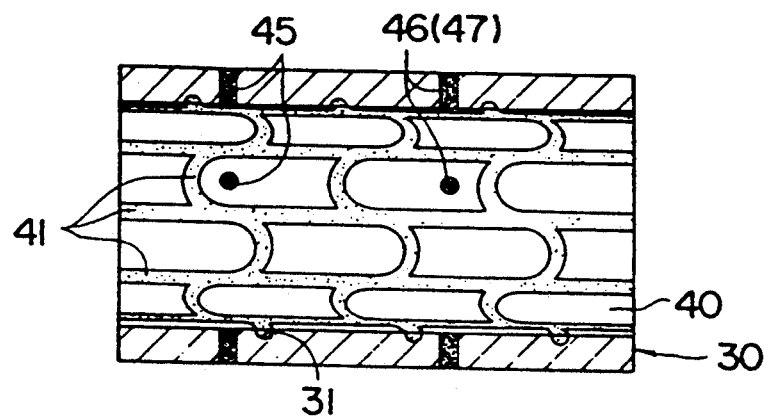
FIG. 6 is a sectional view of a modification of the present invention.

Besides, as shown in FIG. 6, axially extending stripe-like solid lubricating materials 41 and arcuate solid lubricating materials 41a connecting the stripe-like solid lubricating materials 41 may be provided.

Figure 7:
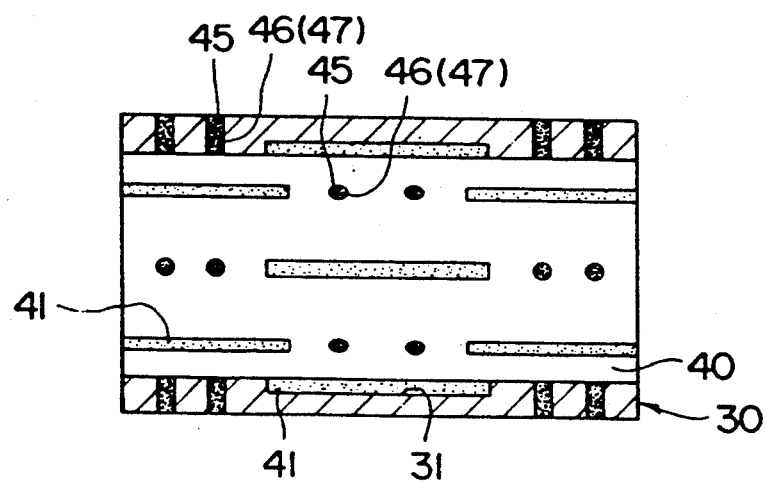
FIG. 7 is a sectional view of a modification of the present invention.

Alternatively, the solid lubricating materials 41 are not required to be linked with each other and short stripe-like solid lubricating materials 41 may be disposed disconnectedly, as shown in FIG. 7.

Alternatively, the solid lubricating material 41 and the oil supplying pores 45 as well as the continuous pore member 46 or the solid lubricating material 47 are not set in the separate positions but may be set in the same position so as to overlap each other.

Figure 8:
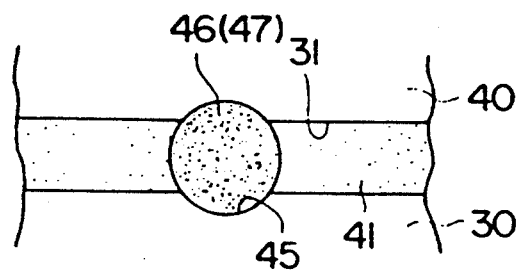
FIG. 8 is a partial front view of a modification of the present invention.
Figure 9:
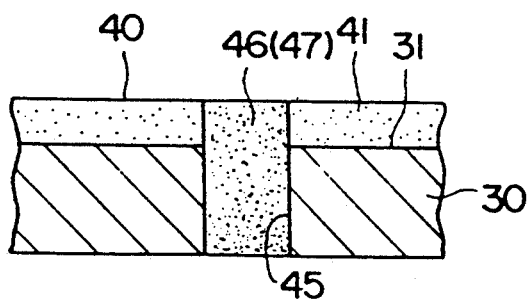
FIG. 9 is a partial sectional view of a modification of the present invention.

For example, as shown in FIGS. 8 and 9, arrangement may be such that an oil supplying pore 45 is formed aligning with groove 31 and a continuous pore material 46 or a solid lubricating material 47 extends through a solid lubricating material 41 in the groove 31 to be exposed on the sliding surface 40.

Figure 10:
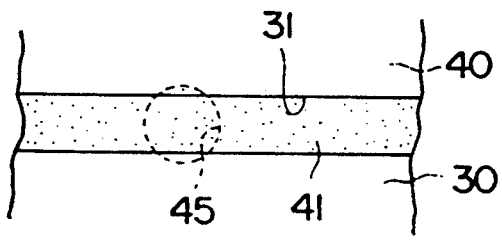
FIG. 10 is a partial front view of a modification of the present invention.
Figure 11:
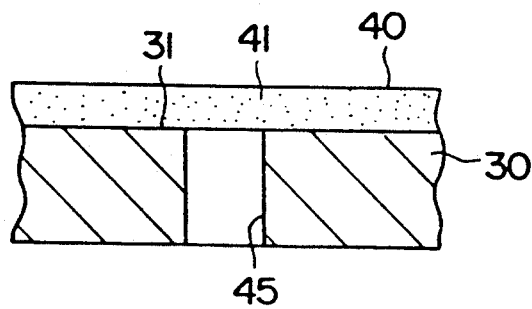
FIG. 11 is a partial sectional view of a modification of the present invention.

As shown in FIGS. 10 and 11, when a material having pores is used as the solid lubricating material 41 an oil supplying pore 45 communicating with the reverse side of the groove 31 may be formed, such that a lubricating oil is supplied directly to the reverse side of the solid lubricating material 41.

Figure 12:
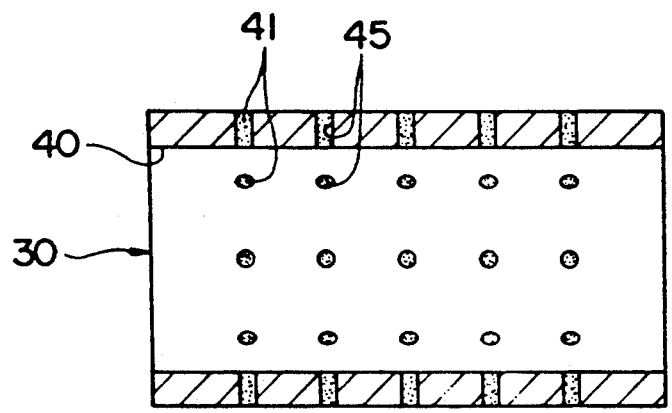
FIG. 12 is a sectional view of a modification of the present invention.

Furthermore, the form of the solid lubricating material 41 is not limited to that of a groove or a lattice, and it may be a porous material, as shown in FIG. 12.

In this case, a material such as graphite having the continuous pores suitable for supplying an oil as well as sufficient lubricativeness may be selected as the solid lubricating material 41 and filled into the oil supplying pores 45 such that the solid lubricating material 41 serves also as the continuous pore material 46 for supplying an oil or the solid lubricating material 47.

As the basic material of the bushing sleeve body 30 forming the sliding surface 40, a steel nitride and the like having adequate lubricativeness may be used in addition to the regular steel material in the embodiment to thereby improve the lubricativeness of the sliding surface 40 furthermore.

The seal structure 42, or 44 formed around the oil reservoir 43 and the sliding surface 40 is not limited to the one using O-ring seals 33, 36 or the like as in the embodiment, and other type of seal structures may be used if they can prevent the leak of oil out of the appropriate parts.

According to the present invention, as describe above, sufficient lubrication performance is obtained by combining lubrication with the solid lubricating material and the lubricating oil while the strength of the fixed lubrication material is increased. Maintenance work such as replenishment is reduced and ambient stain is prevented by supplying the lubricating oil filled in the oil reservoir little by little to the sliding surface through the oil supplying pores.

What is claimed is:

1. A sliding structure for a high load, comprising:
 a solid lubricating material buried in any one of a pair of surfaces sliding on each other under high load;
 an oil reservoir of a predetermined capacity formed at the reverse surface of any one of said sliding surfaces;
 an oil supplying pore extending from said oil reservoir to said sliding surface concerned; and
 a pore holding member having minute continuous pores and being substantially coextensive with said oil supplying pore, said pore holding member being inserted into said oil supplying pore such that when a lubricating oil is supplied to said oil supplying pore said pore holding member provides a limited supply of oil to said sliding surface concerned.

2. A sliding structure as claimed in claim 1, wherein said oil supplying pore is 5 mm in diameter, and the ratio of pores of said continuous pore material is 10-25%.

3. A sliding structure as claimed in claim 2, wherein said continuous pore material is graphite.

4. A sliding structure as claimed in claim 1, wherein:
 said oil supplying pore is 2 mm in diameter; and
 said pore holding member includes a solid lubricating material.

5. A sliding structure as claimed in claim 4, wherein said solid lubricating material is a mixture of molybdenum disulfide powder and an epoxy resin.

6. A sliding structure as claimed in claim 1, wherein said solid lubricating material is buried in crossing grooves, said grooves defining cells therebetween.

7. A sliding structure as claimed in claim 6, wherein each of the cells has an oil supplying pore.

8. A sliding structure as claimed in claim 6, wherein the shape of section of said groove is semicircular.

9. A sliding structure as claimed in claim 1, wherein said solid lubricating material is buried in a plurality of long, thin grooves extending along the axis of the structure and a plurality of arcuate grooves each connecting adjacent long thin grooves.

10. A sliding structure as claimed in claim 1, wherein said solid lubricating material is buried in a plurality of disconnectedly distributed grooves.

11. A sliding structure as claimed in claim 1, wherein said pore holding member is exposed on the sliding surface through said solid lubricating material.

12. A sliding structure as claimed in claim 1, wherein said oil supplying pore is formed so that the oil of said oil reservoir is supplied to the reverse side of said pore holding member.

13. A sliding structure as claimed in claim 1, wherein said oil reservoir has a seal structure for the prevention of leaks of the lubricating oil.

14. A sliding structure as claimed in claim 1, wherein the sliding surface has a seal structure for the prevention of leak of the lubricating oil.

15. A sliding structure as claimed in claim 1, wherein one of said pair of sliding surfaces is a surface of a tie rod and the other of said pair of sliding surfaces is a surface of a brushing sleeve.

16. A sliding structure as claimed in claim 15, wherein said oil reservoir is formed in the reverse surface of said tie rod.

17. A sliding structure as claimed in claim 15, wherein said solid lubricating material is buried in said sliding surface of said tie rod.

* * * * *